J. BUSH.
Corn Planter.
No. 103,427. Patented May 24, 1870.
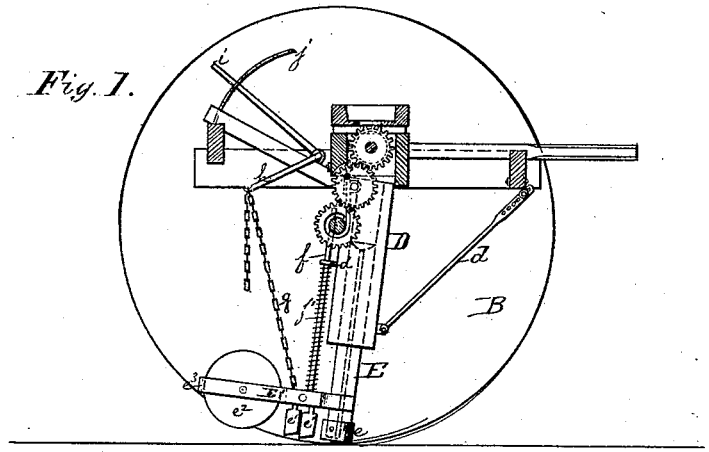
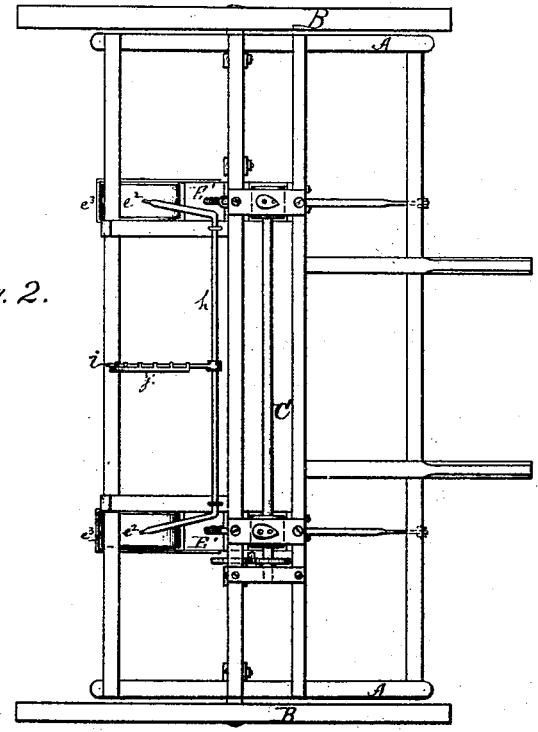
Witnesses:
S. J. Noyes
Wm T. Hutchinson
Inventor:
Jacob Bush by
H. W. Beadle atty

United States Patent Office.

JACOB BUSH, OF DARIEN, WISCONSIN.

Letters Patent No. 103,427, dated May 24, 1870.

IMPROVED BROOM-CORN SEED-PLANTER.

The Schedule referred to in these Letters Patent and making part of the same.

To all whom it may concern:

Be it known that I, JACOB BUSH, of Darien, in the county of Walworth and State of Wisconsin, have invented a new and useful Machine for Planting Broom-corn Seed; and I do hereby declare that the following is a full and exact description of the same, reference being had to the accompanying drawings and to the letters of reference marked thereon.

This invention has for its object the production of certain devices, which may be attached to any seeding-machine of proper construction, and thereby render it suitable for planting broom-corn seed, and consists mainly in the employment of earth-openers, in connection with coverers and a roller, the whole being adjustably attached to the tube of a seeding-machine, as will be fully described hereinafter.

In the drawings—

Figure 1 represents a transverse sectional elevation, and

Figure 2, a plan view of my improved machine.

A A represent the frame of a seeding-machine, which is suitably supported upon the wheels B B in the usual manner.

C represents the main shaft, which is provided with seed-cylinders of any proper construction, and receives motion, in any suitable manner, from one of the wheels B, it being so arranged, of course, as to permit the seeding-mechanism to be thrown out of gear when desired.

Suitable hoppers are provided for holding the seed above the cylinders in the usual well-known manner.

The frame also is provided with handles, to enable it to be guided properly by the operator.

All these parts, however, are old and well known in seeding-machines, and as I do not claim them, I need not here dwell specifically upon their construction.

D D represent the delivery-tubes, which are hinged to the frame in any proper manner, and are held ordinarily in place by means of the draught-rods $d\ d$, which latter are provided with holes at the forward ends, to permit their adjustment when necessary, and are also secured to the tubes at their rear ends by wooden pins, which will readily give way in case a serious obstruction is met with, and permit the tubes to swing back without injury.

E represents an inner tube, which fits snugly into the outer tube D, and has a vertical movement therein, as will be fully described hereinafter.

The lower end of this tube is provided with an earth-opener, $e$, of wedge-shape form, which opens a furrow for the reception of the seed.

$e^1\ e^1$ represent coverers, consisting of small spade-like pieces, rigidly attached to the arm E' attached to the tube E.

These coverers are followed by a roller, $e^2$, which is secured to the arm E' by a band, $e^3$, the rear part of which latter acts as a scraper to keep the roller clean.

To enable the earth-openers, coverers, and rollers to adapt themselves to the unevenness of the ground, I make the tube E adjustable in the tube D, and also provide a vertical rod, $f$, which is rigidly attached to the arm E', and moves in a guide, $d$, in rear of tube D, as shown.

Between the arm E' and guide $d$ I place a spiral spring, $f'$, as shown.

For the purpose of lifting the tubes entirely from the ground when desired, I provide chains $g$ and the rock-shaft $h$, the latter of which is actuated by means of the lever $i$ and rack-bar $j$.

It will be observed that the distance between the main wheels and the seed-tubes is just one-half of the distance between the tubes themselves. By this arrangement the rows are all made with equal distances between them, inasmuch as the wheel next to the planted space, in returning, runs in the track previously made by the opposite wheel.

The operation is as follows:

The seed is placed in the hoppers, and delivered by the seed-cylinders in the usual manner. As it falls through the tube it is deposited in the furrow, covered by the covering-plates, the earth pressed down upon it by the roller.

By means of the tube E and the roller the opening and covering-devices are adjusted to suit the unevenness of the ground, so that no seed is buried too deeply, nor any scattered on the surface.

If the roller is made of sufficient weight, the spring may be dispensed with.

The advantages of covering the seed as soon as deposited, and of pressing the earth thereon, are well understood, and need not be particularly set forth.

Having thus fully described my invention,

What I claim as new, and desire to secure by Letters Patent, is—

The combination of the tubes D and E with the arm E', opener $e$, coverers $e^1\ e^1$, roller $e^2$, rod $f$, and spring $f'$, as described, for the purpose set forth.

This specification signed and witnessed this 17th day of February, 1870.

JACOB BUSH.

Witnesses:
G. W. FORD,
W. PALMER.